(12) United States Patent
Roy et al.

(10) Patent No.: US 11,228,885 B2
(45) Date of Patent: Jan. 18, 2022

(54) OVER THE AIR PROVISIONING OF EMBEDDED SUBSCRIBER IDENTIFICATION MODULE DEVICES

(71) Applicant: T-Mobile USA, Inc., Bellevue, WA (US)

(72) Inventors: Tanmay Roy, Redmond, WA (US); Ryan King, Renton, WA (US); Mathew George, Kirkland, WA (US); Phani Ramisetty, Sammamish, WA (US); Cristian Asandului, Snoqualmie, WA (US); Kyeong Hun An, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 80 days.

(21) Appl. No.: 16/658,631

(22) Filed: Oct. 21, 2019

(65) Prior Publication Data

US 2021/0120387 A1 Apr. 22, 2021

(51) Int. Cl.
| | |
|---|---|
| *H04W 8/20* | (2009.01) |
| *H04L 29/08* | (2006.01) |
| *H04W 4/50* | (2018.01) |
| *H04W 4/60* | (2018.01) |
| *H04W 4/14* | (2009.01) |
| *H04W 8/26* | (2009.01) |
| *H04W 8/12* | (2009.01) |

(52) U.S. Cl.
CPC .............. *H04W 4/50* (2018.02); *H04W 4/14* (2013.01); *H04W 4/60* (2018.02); *H04W 8/12* (2013.01); *H04W 8/205* (2013.01); *H04W 8/26* (2013.01)

(58) Field of Classification Search
CPC ........... H04W 4/50; H04W 8/26; H04W 4/14; H04W 8/12; H04W 4/60; H04W 8/205
See application file for complete search history.

(56) References Cited

U.S. PATENT DOCUMENTS

| | | | |
|---|---|---|---|
| 2016/0105540 A1* | 4/2016 | Kwon | ................ H04N 21/4312 715/747 |
| 2018/0077566 A1* | 3/2018 | Cha | ......................... H04W 8/24 |

\* cited by examiner

Primary Examiner — Joseph E Dean, Jr.
(74) Attorney, Agent, or Firm — Lee & Hayes, P.C.

(57) ABSTRACT

Techniques for provisioning electronic devices that may not have a local provisioning agent (LPA), such as Internet of Things (IoT) devices, to a mobile network of a mobile network operator (MNO), are discussed herein. The IoT devices and/or the associated embedded subscriber identity module (eSIM) may have one or more device profile templates stored thereon, where individual ones of the device profile templates are associated with a particular MNO. A device provisioning system of an MNO may provision the IoT device in a machine-to-machine (M2M) manner over the air (OTA) by communicating, such as via a radio node, one or more configuration parameters to the IoT device. The IoT device may identify a device profile template associated with the MNO to which the IoT device is to be provisioned and configure that device profile template based at least in part on the configuration parameters received from the device provisioning system.

20 Claims, 7 Drawing Sheets

OVER THE AIR PROVISIONING OF EMBEDDED SUBSCRIBER IDENTIFICATION MODULE DEVICES

BACKGROUND

With the proliferation of mobile electronic devices, such as Internet of Things (IoT) devices, there is increased need to remotely provision these mobile electronic devices to communicate over a mobile communications network. Often times, the mobile electronic devices, to be provisioned for operating on a mobile network operator (MNO), may not be configured to be provisioned via a user interface or from a website or other pre-existing connection from where a device profile may be downloaded to the electronic device. In these cases, the mobile electronic devices, such as IoT devices, may be provisioned over the air (OTA), such as by using short message service (SMS) messaging. Provisioning IoT and other devices OTA using SMS and other segmented and/or low bandwidth communications mechanisms may be slow and/or error prone.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
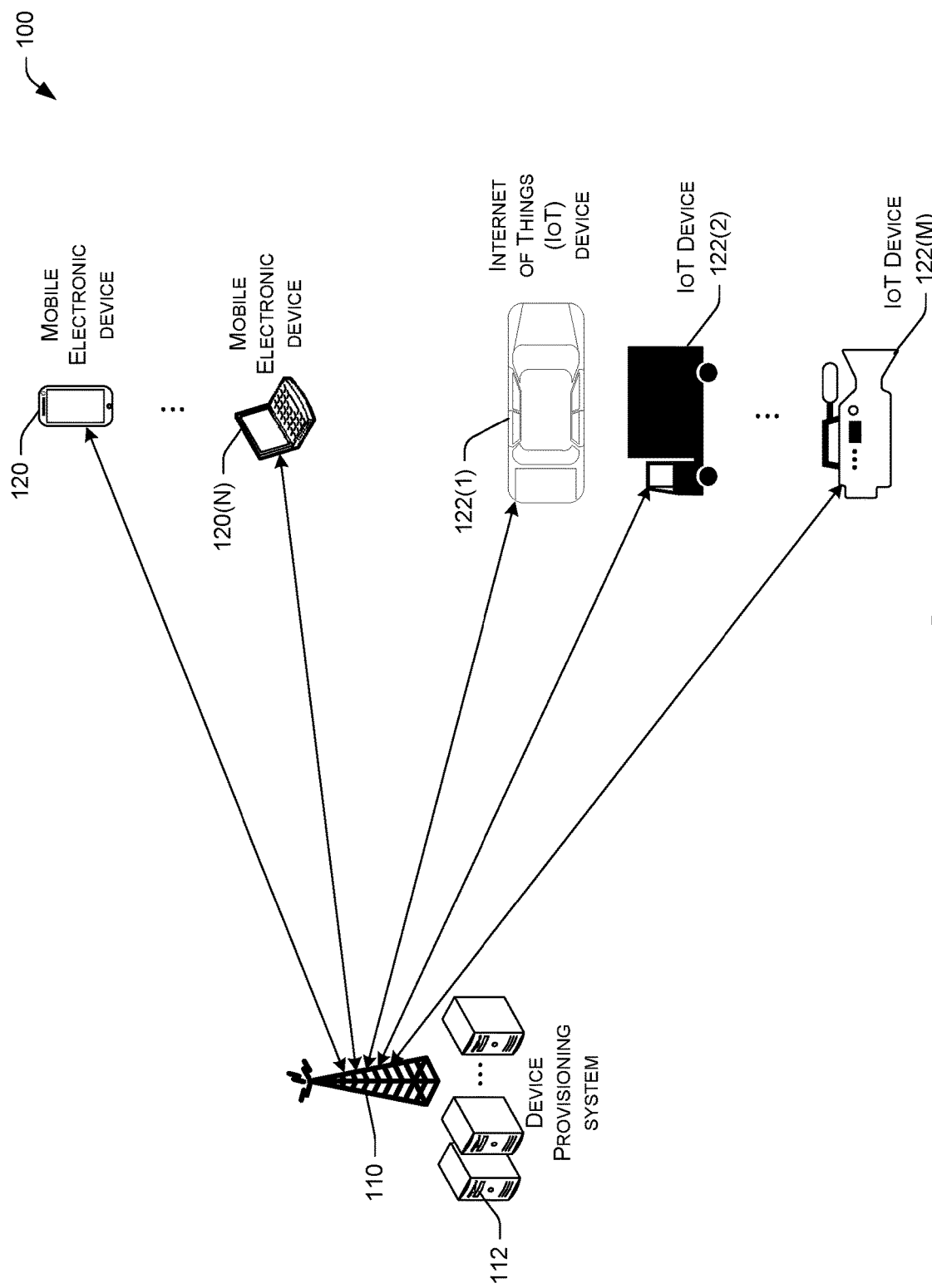
FIG. 1 illustrates a schematic diagram of an example environment with a variety of mobile electronic devices, including mobile electronic devices with user interfaces and Internet of Things (IoT) device, that are to be provisioned by a device provisioning system to operate on a mobile network, in accordance with example embodiments of the disclosure.

Example embodiments of this disclosure describes methods, apparatuses, computer-readable media, and systems for performing an over-the-air (OTA) provisioning of embedded subscriber identification modules (eSIMs) and/or embedded universal integrated circuit cards (eUICCs) of mobile electronic devices, such as IoT devices. In some cases, the provisioning of the eSIMs of these IoTs may not be initiated by the IoT, such as via user interaction on a user interface. The electronic devices and/or their eSIMs may not include user interfaces and/or a local profile agent (LPA) used to initiate a download of a device profile to provision the electronic device, such as in the case of an IoT device. Therefore, these electronic devices without an LPA may be provisioned to a communications network in a machine-to-machine (M2M) fashion, such as OTA.

In example embodiments, the eSIMS and/or the associated electronic device may have, stored thereon, one or more device profile templates or skinny profiles associated with various mobile network operators (MNOs). The provisioning process may use a device profile template associated with the MNO to which the IoT device is to be provisioned. The provisioning mechanism may enable parametrized activation of elements of the device profile template corresponding to the MNO to which the IoT device is to be provisioned to generate a device profile of the provisioned IoT device.

Generally, when an IoT or other mobile electronic device without an LPA is to be provisioned to a particular MNO, the profiling process may be performed OTA to provide a device profile associated with the MNO on the IoT and/or the eSIMs associated with the IoT. Transferring a full device profile may be performed via a relatively low bandwidth message transfer mechanism, such as short message service (SMS) messaging. The device profile may be about 4 kilobytes (KB) to 10 KB in length and transferring the full device profile via SMS messaging may be time-consuming and error prone. In many cases, the device profile may be separated in several segments for transmission via SMS messaging and may need to be stitched back together, or otherwise reassembled, on the IoT device-side. This process presents additional processing and a greater possibility of bit errors in transmission and reconstruction of the device profile on the IoT device. The mechanisms disclosed herein enable the provisioning of an IoT device with a full device profile without having to transmit the full device profile OTA, thereby making the device profile activation process more robust, less expensive, and/or less time-consuming.

According to example embodiments, various device profile templates or skinny profiles may be stored on the IoT devices and/or their eSIMs, such as on non-volatile memory. These profile templates may be provided on the IoT devices/ eSIM devices by the manufacturer of the eSIMs and/or in cooperation between various MNOs and the manufacturer of the IoT devices. Individual ones of the device profile templates may correspond to individual MNOs and one of the device profile templates, as stored on the IoT device, may be used to generate the device profile for provisioning the IoT device to a mobile network. If an IoT device is to later be provisioned to a different mobile network, then another device profile template may be used to generate a different device profile to enable that switch of mobile carriers.

A device provisioning system of an MNO to which an IoT device is to be provisioned may receive an identifier (e.g., International Mobile Equipment Identity (IMEI), International Mobile Subscriber Identity (IMSI), etc.) corresponding to the IoT device to be provisioned and/or the IoT device's eSIM and/or eUICC. The device provisioning system, via a radio node (e.g., eNodeB, gNodeB, etc.) may transmit one or more messages to the IoT device. The IoT device may receive these messages and be able to identify that these messages are directed to itself based at least in part on the identifier of the IoT device (e.g., IMEI, IMSI), as carried on the messages. The IoT device may further be configured to identify an MNO to which it is being provisioned and identify a device profile template, as stored in its own storage (e.g., flash memory), associated with that MNO. The identified device profile template may be used by the IoT device and the device provisioning system to generate a device profile to provision the IoT device to the mobile network of the MNO.

The message(s) sent by the device provisioning system of the MNO may further include one or more configuration parameters. These configuration parameters may be identified by the IoT device and used to activate/deactivate and/or otherwise configure elements of the device profile template of the MNO. In other words, profile elements of the device profile template may be set by the IoT device responsive to the device provisioning system of the MNO sending the profile configuration parameters OTA to the IoT device, such as by SMS messaging. Thus, the IoT device may parse through the message(s), such as SMS message(s), as received from the device provisioning system and identify an MNO to which it is being provisioned, identify one of one or more device profile templates, as stored thereon, and configure that device profile template based at least in part on configuration parameters received from the device provisioning system to generate the device profile that the IoT device will need to communicate over the mobile network of the MNO.

The transmission of these device profile configuration parameters, rather than a full device profile, may reduce the amount of provisioning data sent OTA. In other words, by storing profile elements in memory (e.g., flash memory) at the IoT device and/or associated eSIM that can be activated and/or deactivated, rather than having to be transferred in their entirety, the amount of data that is to be transferred for provisioning the IoT device and/or associated eSIM is reduced. Thus, the embodiments, as disclosed herein, improve the robustness of the IoT provisioning process, particularly when the provisioning process can avoid conducting via a segmented transfer of data via low bandwidth mechanism, such as SMS message.

According to example embodiments, an MNO (e.g., the device provisioning system of the MNO) can configure the entirety of a particular profile template (e.g., the profile template corresponding to that MNO) to provision the IoT device and associated eSIM. Since a single bit may be sent to activate or deactivate particular profile elements, rather than a full transmission of that profile element, the amount of data that needs to be transferred may be reduced significantly. For example, profile elements that can be activated within the profile templates may include the service provider name (SPN) and/or roaming partner names. In some cases, the transfer of 1 KB of data for provisioning an eSIM may be reduced to a single byte of data transfer OTA by using this mechanism.

In example embodiments, the IoT device and/or the eSIM associated therewith may have the memory, such as flash memory, with one or more partitions. In some cases, the various device profile templates corresponding to different MNOs may be stored in one portion of the memory. These device profile templates may be accessed by the IoT device from the memory as needed to generate the device profile that provisions the IoT device to a particular MNO and its associated mobile network. When the IoT device generates the device profile, as described herein, the IoT device may store that device profile to another portion of its memory separate from where the various device profile templates are stored. The IoT device may be configured to access this other part of memory to access the device profile to enable the IoT device to access the mobile network to which it was provisioned.

In some example embodiments, the IoT device may be provisioned to a mobile network for which the IoT device does not have a device profile template stored in its memory. In other words, the IoT device manufacturer, the associated eSIM device manufacturer (if different), and/or the MNO to which the IoT device is to be provisioned did not pre-load a device profile template corresponding to that MNO onto the IoT device. In this case, the device provisioning system, individually and/or in cooperation with the IoT device, may determine that the IoT device does not have a device profile template corresponding to the MNO to which the IoT device is to be provisioned. As a result, a full device profile is to be sent to the IoT device to provision that IoT device to that MNO.

It should be appreciated that the mechanisms, as disclosed herein, may provide the ability to MNOs to provision eSIMs of IoT devices in a machine-to-machine (M2M) manner. The embodiments disclosed enable the provisioning of IoT devices remotely and without the use of a local provisioning agent. Thus, the disclosure herein may enable large scale IoT deployments with more robust provisioning of IoT devices and with reduced amounts of provisioning data to be transmitted to the IoT devices to be provisioned.

Certain implementations and embodiments of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the embodiments, as described herein. Like numbers refer to like elements throughout.

FIG. 1 illustrates a schematic diagram of an example environment 100 with a variety of mobile electronic devices, including mobile electronic devices 120(1), . . . , 120(N) with user interfaces, hereinafter referred to as mobile electronic devices 120, and Internet of Things (IoT) devices 122(1), 122(2), . . . 122(M), hereinafter referred to as IoT devices 122, that are to be provisioned by a device provisioning system 112 to operate on a mobile communications network, in accordance with example embodiments of the disclosure.

The example environment 100 may include a radio node 110 (e.g., eNodeB, gNodeB) that establishes radio connections to mobile electronic devices 120, 122. The radio node may further cooperate with the device provisioning system 112 to provision the mobile electronic devices 120, 122 to an MNO with which the radio node 110 is associated. In example environments, mobile electronic devices 120, via their local provisioning agents (LPA) with which users may interact, may be provisioned via a website. In this case, a device profile associated with the MNO may be downloaded to the mobile electronic devices 120. Although the mobile electronic devices 120 are depicted as a smartphone 120(1) and a laptop computer 120(N), it will be appreciated that the mobile electronic devices 120 may be any suitable mobile electronic devices 120 with an LPA. Mobile electronic devices 120 may include, but is not limited to, a tablet computer, a voice device, televisions, set-top boxes, computers, computing devices, servers, notebook computers, netbook computers, personal digital assistants (PDAs), smartphones, telephones, tablets, in-vehicle infotainment systems (IVIs), combinations thereof, or the like.

In contrast to the mobile electronic devices 120, the IoT devices 122, lacking an LPA and often in remote deployments, may be provisioned, according to example embodiments, OTA. Provisioning the IoT devices 122 may be performed by providing a device profile associated with the MNO on the IoT device 122, such as on an eSIM of the IoT device 122. The IoT device 122, although depicted as a tracking device for a car 122(1), a cargo tracking tag 122(2), and/or an equipment tracking tag 122(M), it should be understood that the IoT device 122 may be any suitable IoT device 122. For example, the IoT device 122 may be any variety of tracking devices, global positioning satellite (GPS) devices, smart tags, radio-frequency identifier (RFID) tags, customer tracking tags, merchandise tracking tags, agriculture product tracking tags, telematics devices, sensor devices, remote monitoring devices, combinations thereof, or the like.

In some cases, the device profile to provision the IoT device 122 may be transferred in its entirety to the IoT device 122 from the radio node 110 OTA. In these example embodiments, the device profile may be divided into smaller segments that can be sent via SMS messaging and sent as a sequence of SMS messages from the radio node 110 to the IoT device 122. In some cases, the device profile may be approximately 4 KB to 10 KB in size. Thus, multiple segments of the device profile may be made to send the entirety of the device profile to the IoT device 122 OTA. As the IoT device 122 receives each of the segments of the device profile, the IoT device 122 stiches those device profile segments back together to create the entirety of the device profile.

In example embodiments, the IoT devices 122 may have, stored thereon, one or more device profile templates, also referred to herein as skinny profiles. Each device profile template may correspond to a particular MNO to which the IoT device 122 may be provisioned. The various device profile templates may be stored on a local memory, such as flash memory, of the IoT device 122. In some cases, the memory on which the various device profile templates are stored may be part of the embedded subscriber identification module (eSIM) of the IoT device 122. The IoT device 122 may be provisioned to a particular MNO using one of the device profile templates stored on the IoT device 122.

The device provisioning system 112 may be part of the mobile network associated with the radio node 110. In example embodiments, when an IoT device 122 is to be provisioned to a mobile network of an MNO with which the device provisioning system 112 is associated, the device provisioning system 112 may receive an indication that the IoT device 122 is to be provisioned. This indication may include an identity of the IoT device 122 and/or its eSIM. For example, the IoT device 122 may be identified by its International Mobile Equipment Identity (IMEI) and/or International Mobile Subscriber Identity (IMSI). Responsive to receiving an indication that the IoT device 122 is to be provisioned, the device provisioning system 112, may commence the process of provisioning the IoT device 122.

In example embodiments, the device provisioning system 112, via the radio node 110, may send a signal carrying an identity of an MNO to which an IoT device 122 is to be provisioned. The signal sent by the device provisioning system 112 to initiate the provisioning process may include a device identity (e.g., IMEI, IMSI, etc.) of the IoT device 122 that is to be provisioned. The IoT device 122 may determine that the received signal is intended for it by recognizing that the device identity is its own identity.

The IoT device 122 to be provisioned may identify the MNO to which it is to be provisioned from the received signal from the device provisioning system 112. The IoT device 122 may then identify the device profile template associated with the MNO to which it is to be provisioned and use that device profile template for the provisioning process. The device provisioning system 112, via the radio node 110, may send one or more communications, such as in the form of SMS messaging and/or Rich Communications Services (RCS) messaging to the IoT device 122. These messages may carry a number of configuration parameters to configure the device profile template to generate the device profile for the IoT device 122. In other words, the configuration parameters may indicate a choice of one or more options that are to be configured on the device profile template to generate the device profile.

In example embodiments, a profile element that can be activated within the device profile template may include the service provider name (SPN). In this case, the device provisioning system 112 may send an indication of the SPN that is to be used by the IoT device 122 being provisioned as a configuration parameter. The IoT device 122, upon receiving an indication of the SPN, may activate portions of the device profile template being configured to indicate the SPN. Another example configuration parameter may include names of roaming partner(s) that he IoT device 122 being provisioned is to use. The transmission of the configuration parameters to configure the device profile template to generate the device profile, instead of transmitting the entirety of the device profile, can result in a substantial reduction in the amount of data transmitted OTA. In some cases, the transfer of 1 KB of data for provisioning an eSIM may be reduced to a single byte of data transfer OTA by using this mechanism.

Figure 2:
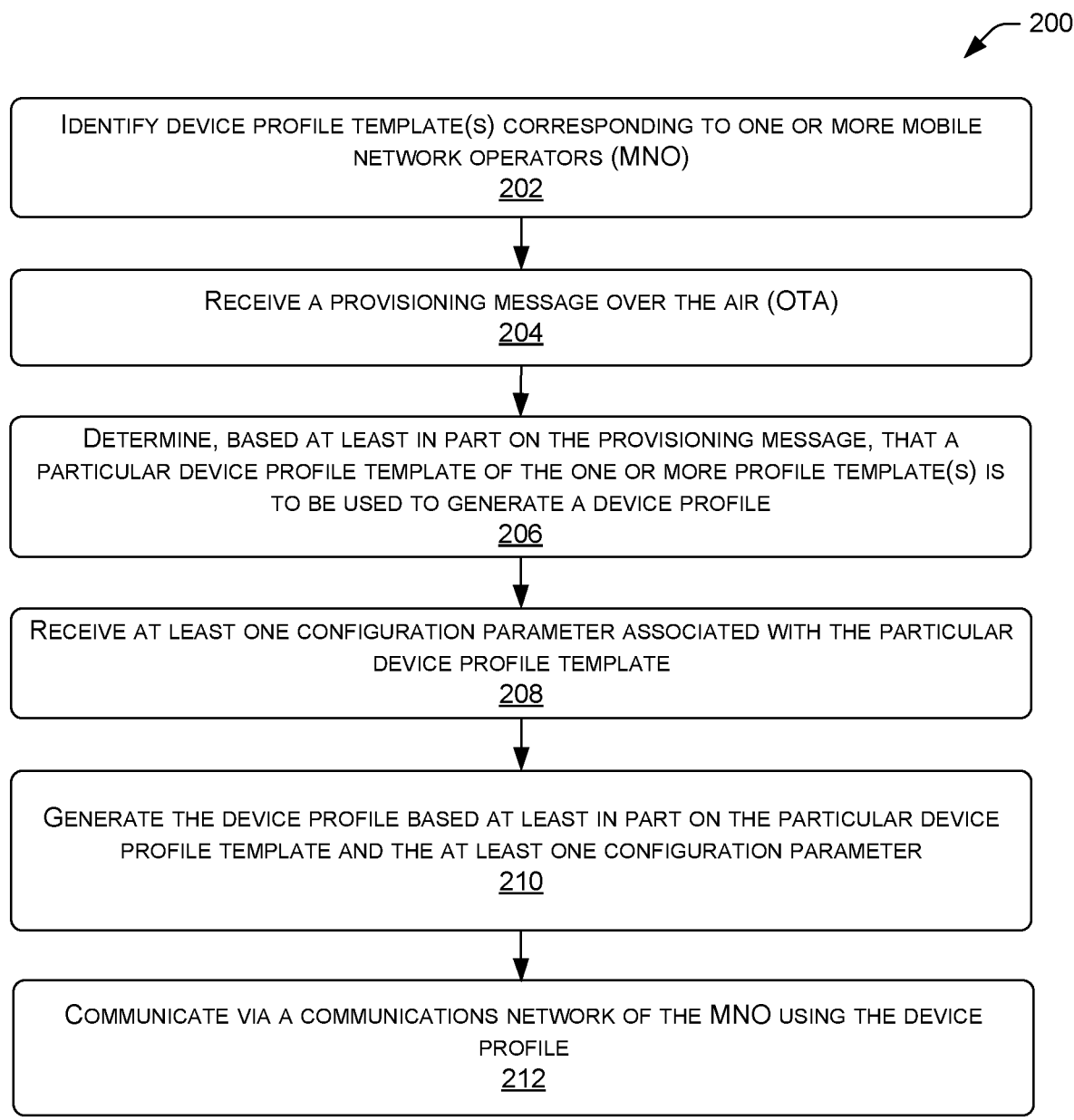
FIG. 2 illustrates a flow diagram of an example method by which an IoT device may be provision OTA to a communications network, in accordance with example embodiments of the disclosure.

FIG. 2 illustrates a flow diagram of an example method 200 by which an IoT device 122 may be provision OTA to a communications network, in accordance with example embodiments of the disclosure. The method 200 may be performed by the IoT device 122 in cooperation with one or more other elements of environment 100 of FIG. 1, such as device provisioning system 112. The method 200 may be used to provision an IoT device 122 for a first time or to provision an IoT device 122 to a new mobile communications network.

At block 202, device profile templates corresponding to one or more MNOs may be identified. The IoT device 122 may have various device profile templates stored thereon, where the device profile templates correspond to different MNOs. These device profile templates may be stored on the IoT device 122 and/or its eSIM during the manufacture of the IoT device 122 and/or the eSIM. The IoT device may be aware of the various device profile templates stored thereon and their correspondence to individual MNOs. For example, the IoT device 122 may have a correspondence table between the device profile templates stored thereon and identifiers of their corresponding MNOs.

At block 204, a provisioning message may be received OTA. This message may be sent by the device provisioning system 112 by any suitable mechanism, such as SMS messaging or RCS messaging. The provisioning message, as received OTA by the IoT device 122, may indicate an MNO associated with the mobile network, such as by an identifier of the MNO, to which the IoT device 122 is to be provisioned. The provisioning message may include an identifier of the IoT device 122, such as an IMEI and/or IMSI of the IoT device 122. Thus, the IoT device 122 may identify that the provisioning message is intended for it by identifying that the identifier carried by the provisioning message matches its own identifier. In example embodiments, the provisioning message may be sent by the device provisioning system 112 responsive to the device provisioning system 112 receiving an indication that the IoT device 122 is to be provisioned. In this case, the device provisioning system 112 may generate and send the provisioning message via a radio node 110 that is within radio range of the IoT device 122 to be provisioned. In some cases, provisioning data, as sent by the device provisioning system 112 and received by the IoT device 122, may include the identity of the MNO to which the IoT device 122 is to be provisioned, as well as configuration data for configuring a device profile template associated with the MNO.

At block 206, it may be determined, based at least in part on the provisioning message, that a particular device profile template of the one or more device profile template is to be used to generate a device profile. The IoT device 122 may use any indication of the MNO to which it is to be provisioned, as received in the provisioning message, to access the device profile template corresponding to the MNO to which the IoT device 122 is to be provisioned. This may entail accessing the device profile template from memory (e.g., flash memory) where the device profile templates are stored.

At block 208, at least one configuration parameter associated with the particular device profile template may be received. The configuration parameters may be received OTA via any suitable mechanism, such as SMS messaging and/or RCS messaging. As discussed herein, the configuration parameters may be determined and/or sent by the device provisioning system 112 via the radio node that is within radio range of the IoT device 122 that is to be provisioned. In some cases, the configuration parameters may be received as part of the same provisioning message of block 206. In other cases, the configuration parameters may be received as separate message(s) from the provisioning message. In yet other cases, some configuration parameters may be received as part of the provisioning message and other configuration parameters may be received as part of separate message(s) from the provisioning message.

The configuration parameters, as determined by and/or sent by the device provisioning system 112 and received by the IoT device 122 to be provisioned, may indicate how to configure the device profile template associated with the MNO to which the IoT device 122 is to be provisioned. In example embodiments, individual configuration parameters may indicate how to configure individual elements of the device profile template that is to be used to generate the device profile. For example, a configuration parameter may indicate a service provider name (SPN) that is to be incorporated in the device profile. The IoT device 122, once provisioned to the mobile network, will need the SPN to communicate via the mobile network to which it is provisioned. As a result, this SPN is to be incorporated into the device profile of the IoT device and/or its eSIM. The indication of the SPN may be parameterized, such that the configuration parameter, as received by the IoT device 122 related to the SPN will allow the IoT device 122 to indicate the SPN corresponding to the received configuration parameter in the device profile being generated. Another example configuration parameter may include names of roaming partner(s) that he IoT device 122 being provisioned is to use.

The transmission of the configuration parameters, by the device provisioning system 112 and received by the IoT device 122, to configure the particular device profile template to generate the device profile may require a substantially reduced amount of data transfer compared to transmitting the entirety of the device profile to the IoT device 122. In some cases, the transfer of 1 KB of data for provisioning an eSIM may be reduced to a single byte of data transfer OTA by using this mechanism. In other words, the amount of data that is sent and/or received by sending configuration parameters, rather than the entirety of the device profile needed to provision the IoT device 122 may be reduced considerably. For example, the amount of data transmitted to provision the IoT device 122 may be reduced by a factor of about 300 to a factor of about 2000. This range is an example, and other reduction factors are contemplated according to example embodiments of the disclosure.

At block 210, the device profile may be generated based at least in part on the particular device profile template and the at least one configuration parameter. As the configuration parameters are received by the IoT device 122, the IoT device may configure the device profile template corresponding to the mobile network to which it is being provisioned. After all of the configuration parameters are received and used to configure the device profile template, the device profile may be generated. This device profile may be stored in a portion of memory that may be designated for the device profile for the mobile network on which the IoT device is to operate.

At block 212, the device profile may be used to communicate via a communications network of the MNO. The device profile may include information that the IoT device 122 needs to communicate via the mobile network to which it was provisioned. The IoT device 122 may further be registered with the mobile network to communicate thereon, such as by the device provisioning system 112.

It should be noted that some of the operations of method 200 may be performed out of the order presented, with additional elements, and/or without some elements. Some of the operations of method 200 may further take place substantially concurrently and, therefore, may conclude in an order different from the order of operations shown above.

Figure 3:
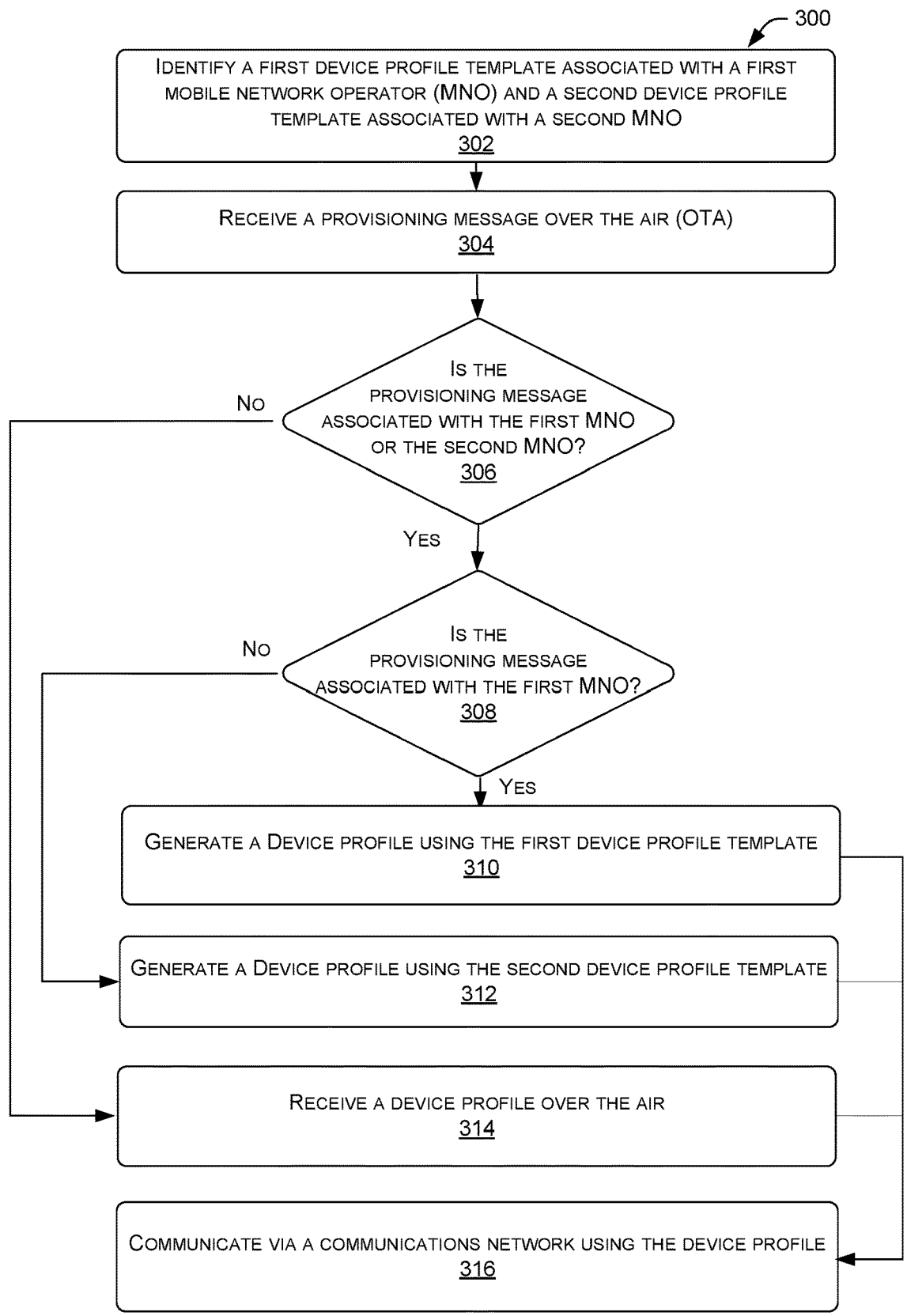
FIG. 3 illustrates a flow diagram of an example method by which a device profile is generated for communicating over a communications network, in accordance with example embodiments of the disclosure.

FIG. 3 illustrate a flow diagram of an example method 300 by which a device profile is generated for communicating over a communications network, in accordance with example embodiments of the disclosure. The method 300 may be performed by the IoT device 122 in cooperation with one or more other elements of environment 100 of FIG. 1, such as device provisioning system 112. The method 300 may be used to provision an IoT device 122 for a first time or to provision an IoT device 122 to a new mobile communications network.

At block 302, a first device profile template associated with a first MNO and a second device template associated with a second MNO may be identified. The first MNO may be any suitable mobile services provider and the second MNO may be a different mobile service provider. When the IoT device 122 and/or eSIM device of the IoT device 122 was manufactured, the first device profile template and the second device profile template may have been stored thereon, such as in a portion of flash memory. These device profile templates may have been provided on the IoT device 122 as a result of cooperation between the first MNO and the manufacturer of the IoT device 122 and a cooperation between the second MNO and the manufacturer of the IoT device 122. If the IoT device 122 is to be provisioned to the first MNO, then the first device profile template may be used to generate a device profile for the IoT device 122. Similarly, if the IoT device 122 is to be provisioned to the second MNO, then the second device profile template may be used to generate a device profile for the IoT device 122

At block 304, a provisioning message may be received OTA. The provisioning message, as received OTA by the IoT device 122, may indicate an MNO associated with the mobile network, such as by an identifier of the MNO, to which the IoT device 122 is to be provisioned. The indicated MNO may be, for example, the first MNO, the second MNO, or another MNO for which the IoT device may not have a corresponding device profile template. The provisioning message may include an identifier of the IoT device 122, such as an IMEI and/or IMSI of the IoT device 122. Thus, the IoT device 122 may identify that the provisioning message is intended for it by identifying that the identifier carried by the provisioning message matches its own identifier. In example embodiments, the provisioning message may be sent by the device provisioning system 112 responsive to the device provisioning system 112 receiving an indication that the IoT device 122 is to be provisioned. In this case, the device provisioning system 112 may generate and send the provisioning message via a radio node 110 that is within radio range of the IoT device 122 to be provisioned.

At block 306, it may be determined if the provisioning message is associated with either the first MNO or the second MNO. The provisioning message may carry an identifier of an MNO to which the IoT device 122 is to be provisioned. The IoT device 122 may compare the identifier of the MNO carried by the provisioning message to identifiers of the first MNO and/or the second MNO to determine if the provisioning message is associated with either the first MNO or the second MNO. If it is determined that the provisioning message is associated with either of the first MNO or the second MNO, then at block 308, it may be determined if the provisioning message is associated with the first MNO.

If it is determined that the provisioning message is associated with the first MNO, then at block 310, a device profile may be generated using the first device profile template. As described herein, the device profile may be generated by configuring the first device profile template based at least in part on configuration parameters received from the device provisioning system 112. When the device profile is generated, the device profile may be stored in a designated portion of memory of the IoT device 122.

If on the other hand, at block 308, it is determined that the provisioning message is not associated with the first MNO, then at block 312, a device profile may be generated using the second profile template. As described herein, the device profile may be generated by configuring the second device profile template based at least in part on configuration parameters received from the device provisioning system 112. When the device profile is generated, the device profile may be stored in a designated portion of memory of the IoT device 122.

At block 306, if it was determined that the provisioning message was neither associated with the first MNO nor the second MNO, then at block 314, the device profile may be received OTA. In this case, the device profile may be received as a series of messages, such as SMS messages, from the device provisioning system 112. The device profile may be segmented across the series of messages and as the messages come in, the payload may be used by the IoT device 122 to reconstruct the device profile as received across the series of messages.

At block 316, the device profile may be used to communicate via a communications network. The device profile may include information that the IoT device 122 needs to communicate via the mobile network to which it was provisioned. The IoT device 122 may further be registered with the mobile network to communicate thereon, such as by the device provisioning system 112.

It should be noted that some of the operations of method 300 may be performed out of the order presented, with additional elements, and/or without some elements. Some of the operations of method 300 may further take place substantially concurrently and, therefore, may conclude in an order different from the order of operations shown above.

Figure 4:
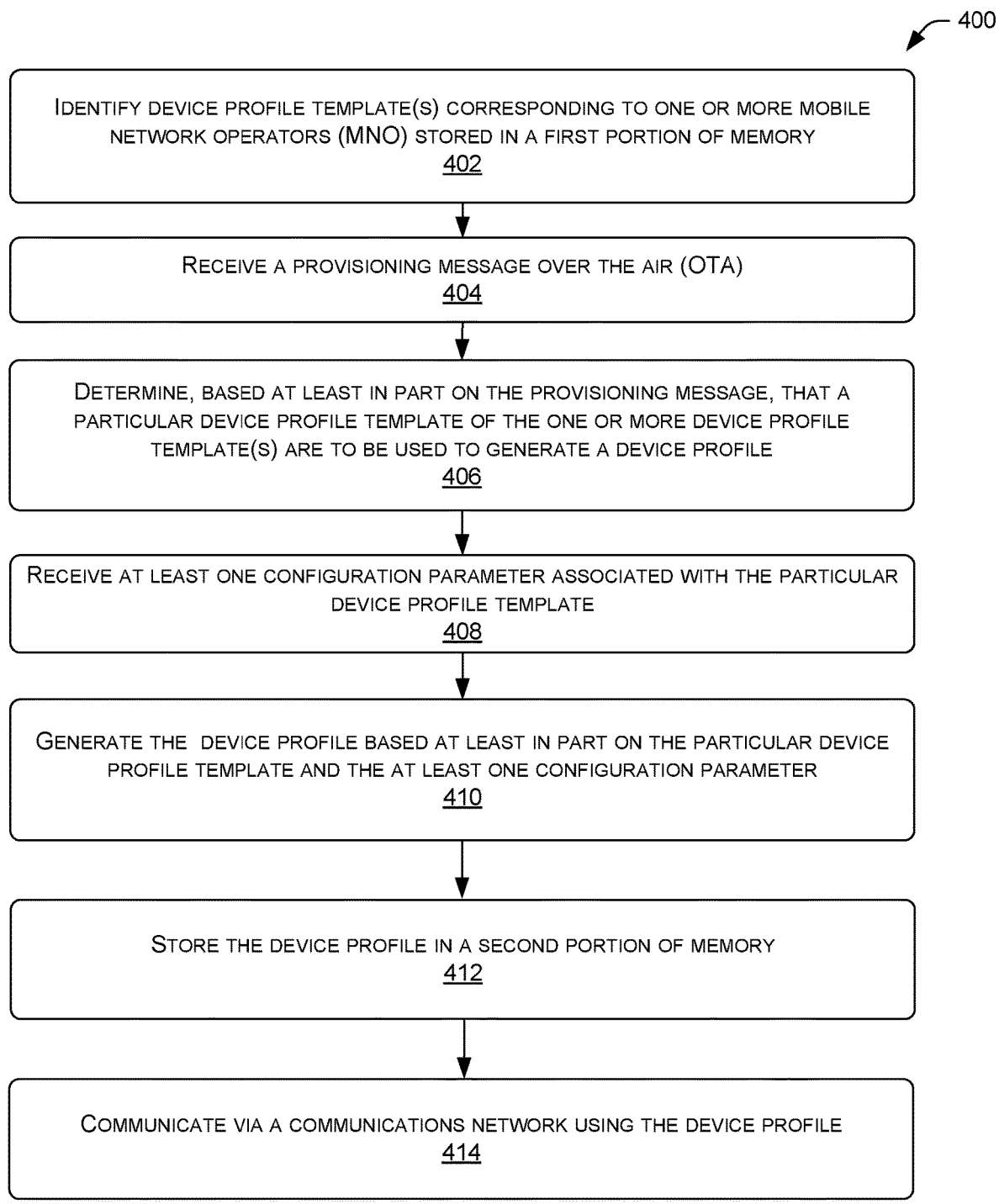
FIG. 4 illustrates a flow diagram of an example method by which device profile is generated based at least in part on a profile template and stored in a particular portion of memory and/or storage, in accordance with example embodiments of the disclosure.

FIG. 4 illustrates a flow diagram of an example method 400 by which device profile is generated based at least in part on a profile template and stored in a particular portion of memory and/or storage, in accordance with example embodiments of the disclosure. The method 400 may be performed by the IoT device 122 in cooperation with one or more other elements of environment 100 of FIG. 1, such as device provisioning system 112. The method 400 may be used to provision an IoT device 122 for a first time or to provision an IoT device 122 to a new mobile communications network.

At block 402, one or more device profile template(s) stored in a first portion of memory and corresponding to one or more MNOs may be identified. These device profile templates may be stored on the IoT device 122 and/or its eSIM during the manufacture of the IoT device 122 and/or the eSIM. The IoT device may be aware of the various device profile templates stored thereon and their correspondence to individual MNOs. For example, the IoT device 122 may have a correspondence table between the device profile templates stored thereon and identifiers of their corresponding MNOs.

At block 404, a provisioning message may be received OTA. This message may be sent by the device provisioning system 112 by any suitable mechanism, such as SMS messaging or RCS messaging. The provisioning message may include an identifier of the IoT device 122, such as an IMEI and/or IMSI of the IoT device 122. Thus, the IoT device 122 may identify that the provisioning message is intended for it by identifying that the identifier carried by the provisioning message matches its own identifier. In example embodiments, the provisioning message may be sent by the device provisioning system 112 responsive to the device provisioning system 112 receiving an indication that the IoT device 122 is to be provisioned. In this case, the device provisioning system 112 may generate and send the provisioning message via a radio node 110 that is within radio range of the IoT device 122 to be provisioned.

At block 406, it may be determined, based at least in part on the provisioning message, that a particular device profile template of the one or more device profile template(s) are to be used to generate a device profile. The provisioning message, as received OTA by the IoT device 122, may indicate an MNO associated with the mobile network, such as by an identifier of the MNO, to which the IoT device 122 is to be provisioned.

At block 408, at least one configuration parameter associated with the particular device profile template may be received. The configuration parameters may be received OTA via any suitable mechanism, such as SMS messaging and/or RCS messaging. In some cases, the configuration parameters may be received as part of the same provisioning message of block 404. In other cases, the configuration parameters may be received as separate message(s) from the provisioning message. In yet other cases, some configuration parameters may be received as part of the provisioning message and other configuration parameters may be received as part of separate message(s) from the provisioning message. In some cases, provisioning data, as sent by the device provisioning system 112 and received by the IoT device 122, may include the identity of the MNO to which the IoT device 122 is to be provisioned, as well as configuration data for configuring the device profile template associated with the MNO.

The configuration parameters, as received by the IoT device 122 to be provisioned, may indicate how to configure the device profile template associated with the MNO to which the IoT device 122 is to be provisioned. In example embodiments, individual configuration parameters may indicate how to configure individual elements of the particular device profile template that is to be used to generate the device profile, as identified by the processes of block 406. For example, a configuration parameter may indicate names of roaming partner(s) that the IoT device 122 being provisioned is to use. This information may be incorporated in the device profile for later use by the IoT device 122 for communicating via the mobile network to which it is provisioned. The indication of the roaming partner(s) may be parameterized, such that the configuration parameter, as received by the IoT device 122 related to the roaming partner(s) will allow the IoT device 122 to indicate the roaming partner(s) corresponding to the received configuration parameter in the device profile being generated. Another example configuration parameter may include a service provider name (SPN).

At block 410, the device profile may be generated based at least in part on the particular device profile template and the at least one configuration parameter. As the configuration parameters are received by the IoT device 122, the IoT device 122 may configure the particular device profile template corresponding to the mobile network to which it is being provisioned. After all of the configuration parameters are received and used to configure the particular device profile template, the device profile may be generated.

At block 412, the device profile may be stored in a second portion of memory. This second portion of memory may be designated for the device profile for the mobile network on which the IoT device is to operate. The second portion of memory, in example embodiments, may be separate from the first portion of memory where the various device profile templates are stored.

At block 414, the device profile may be used to communicate via a communications network. The device profile may include information that the IoT device 122 needs to communicate via the mobile network to which it was provisioned. The IoT device 122 may further be registered with the mobile network to communicate thereon, such as by the device provisioning system 112.

It should be noted that some of the operations of method 400 may be performed out of the order presented, with additional elements, and/or without some elements. Some of the operations of method 400 may further take place substantially concurrently and, therefore, may conclude in an order different from the order of operations shown above.

Figure 5:
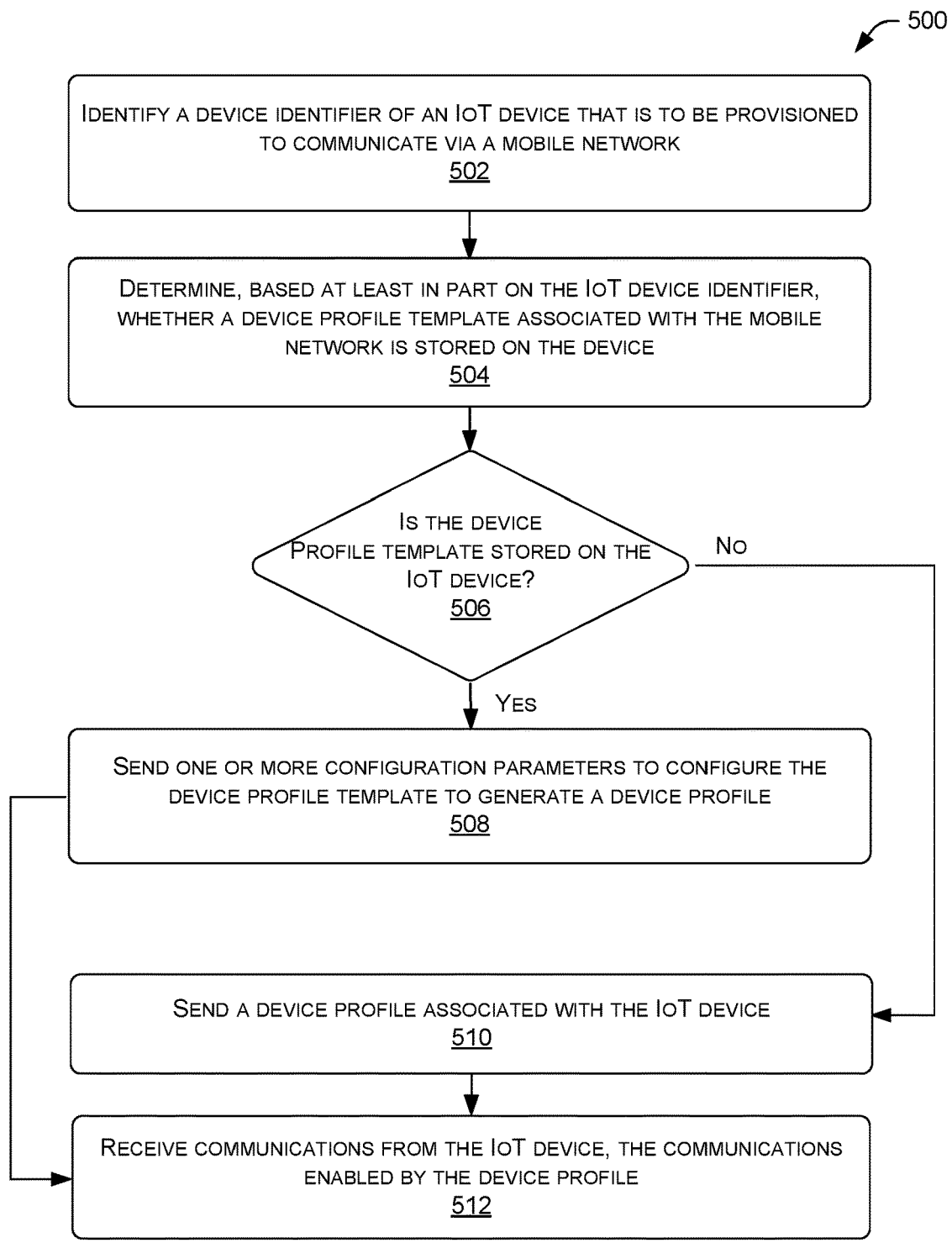
FIG. 5 illustrates a flow diagram of an example method by which a device provisioning system provisions a device, in accordance with example embodiments of the disclosure.

FIG. 5 illustrates a flow diagram of an example method 500 by which a device provisioning system provisions a device, in accordance with example embodiments of the disclosure. The method 500 may be performed by the device provisioning system 112 in cooperation with one or more other elements of environment 100 of FIG. 1, such as IoT device 122. The method 500 may be used to provision an IoT device 122 for a first time or to provision an IoT device 122 to a new mobile communications network.

At block 502, a device identifier of an IoT device that is to be provisioned to communicate via a mobile network may be identified. This device identifier may include, for example, an International Mobile Equipment Identity (IMEI) and/or International Mobile Subscriber Identity (IMSI) of the IoT device 122 to be provisioned. This information may be received, for example, when a customer wishes to deploy his or her IoT device(s) 122 with a particular mobile communications network.

At block 504, whether a device profile template associated with the mobile network is stored on the IoT device may be determined. This may be determined by the device provisioning system 112 by determining the type of the IoT device 122 and identifying whether that IoT device 122 comes preloaded with the device profile template of the device provisioning system 112. In some cases, the device provisioning system 112 may access an external source, such as a web datastore to determine if the IoT device 122 has a device profile template for the mobile network to which it is to be provisioned.

At 506, if the device profile template is stored on the device, then at block 508, one or more configuration parameters may be sent to the IoT device to configure the device profile template to generate a device profile. In example embodiments, the configuration parameters may include a provisioning message that may include an indication of the MNO to which the IoT device 122 is to be provisioned. In example embodiments, individual configuration parameters may indicate to the IoT device 122 how to configure individual elements of the device profile template that is to be used to generate the device profile. For example, a configuration parameter may indicate names of roaming partner(s) that the IoT device 122 being provisioned is to use. Another example configuration parameter may include a service provider name (SPN).

If on the other hand, at block 506, the device profile template is not stored on the IoT device, then the method 500 at block 510, may send a device profile associated with the IoT device. This device profile may be sent OTA in its entirety, since a prestored device profile template is not available for the purpose of generating the device profile. In this case, the device profile may be sent as a series of messages, such as SMS messages, by the device provisioning system 112. The device profile may be segmented across the series of messages to be transmitted as the series of messages to the IoT device 122. The IoT device 122 may receive this series of messages and reconstruct the device profile therefrom.

At block 512, optionally, communications may be received from the IoT device, where the communications are enabled by the device profile. These communications may be communications traffic from the IoT device 122 and/or a confirmation message that the IoT device 122 has been provisioned properly and can communicate via the mobile communications network.

It should be noted that some of the operations of method 500 may be performed out of the order presented, with additional elements, and/or without some elements. Some of the operations of method 500 may further take place substantially concurrently and, therefore, may conclude in an order different from the order of operations shown above.

Figure 6:
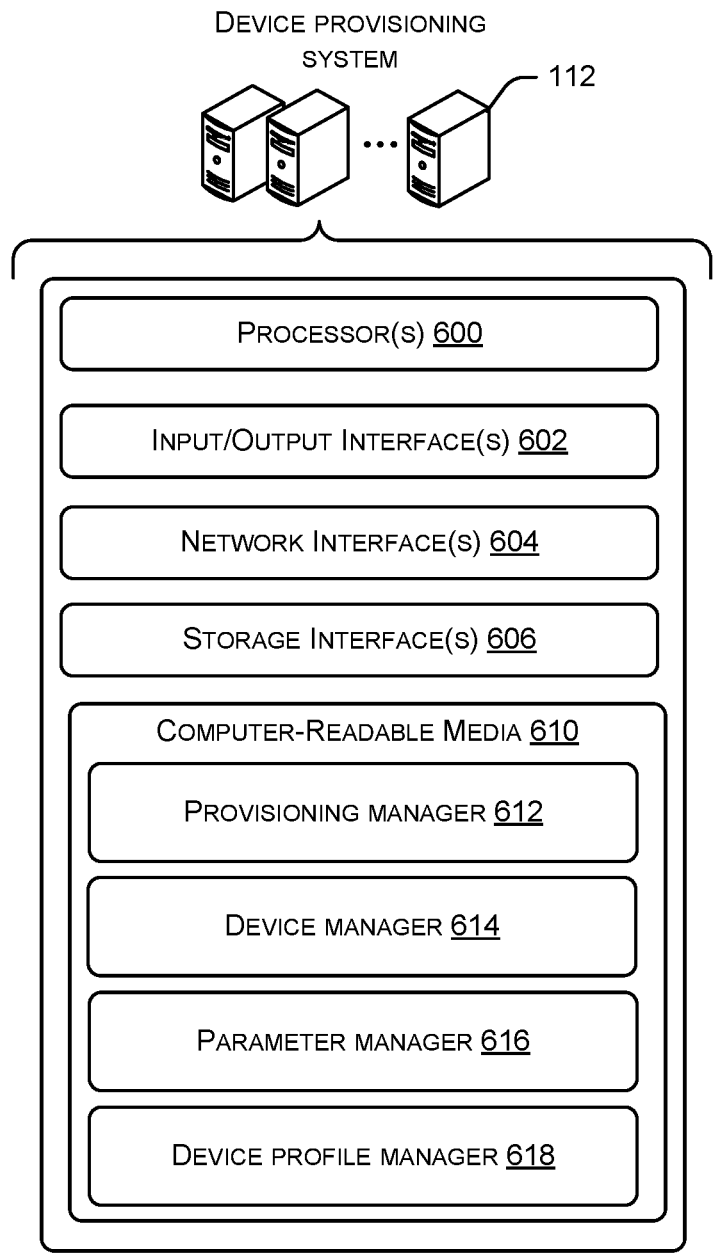
FIG. 6 illustrates a block diagram of an example device provisioning system configured to provision devices to a mobile network operator, in accordance with example embodiments of the disclosure.

FIG. 6 illustrates a block diagram of an example device provisioning system 112 configured to provision devices to a mobile network operator, in accordance with example embodiments of the disclosure. The device provisioning system 112 may include one or more processor(s) 600, one or more input/output (I/O) interface(s) 602, one or more network interface(s) 604, one or more storage interface(s) 606, and computer-readable media 610.

In some implementations, the processors(s) 600 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 600 may possess its own local memory, which also may store program modules, program data, and/or one or more operating systems. The one or more processor(s) 600 may include one or more cores.

The one or more input/output (I/O) interface(s) 602 may enable the device provisioning system 112 to detect interaction with a user. For example, a user may be able to maintain, update, and/or operate the device provisioning system 112.

The network interface(s) 604 may enable the device provisioning system 112 to communicate via the one or more network(s). The network interface(s) 604 may include a combination of hardware, software, and/or firmware and may include software drivers for enabling any variety of protocol-based communications, and any variety of wireline and/or wireless ports/antennas. For example, the network interface(s) 604 may comprise one or more of a cellular radio, a wireless (e.g., IEEE 802.1x-based) interface, a Bluetooth® interface, and the like. In example embodiments, the device provisioning system 112 may be configured to communicate with and/or via the radio node 110.

The storage interface(s) 606 may enable the processor(s) 600 to interface and exchange data with the computer-readable media 610, as well as any storage device(s) external to the device provisioning system 112. The storage interface(s) 606 may further enable access to removable media.

The computer-readable media 610 may include volatile and/or nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 610 may be implemented as computer-readable storage media (CRSM), which may be any available physical media accessible by the processor(s) 600 to execute instructions stored on the computer-readable media 610. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information and which can be accessed by the processor(s) 600. The computer-readable media 610 may have an operating system (OS) and/or a variety of suitable applications stored thereon. The OS, when executed by the processor(s) 600 may enable management of hardware and/or software resources of the device provisioning system 112.

Several components such as instruction, data stores, and so forth may be stored within the computer-readable media 610 and configured to execute on the processor(s) 600. The computer-readable media 610 may have stored thereon a provisioning manager 612, a device manager 614, a parameter manager 616, and a device profile manager 618. It will be appreciated that each of the components 612, 614, 616, 618, may have instructions stored thereon that when executed by the processor(s) 600 may enable various functions pertaining to provisioning IoT devices 122 onto a mobile communications network as described herein.

The instructions stored in the provisioning manager 612, when executed by the processor(s) 600, may configure the device provisioning system 112 to receive an indication of one or more IoT devices 122 that are to be provisioned to a mobile network and MNO with which the device provisioning system 112 is associated. The device provisioning system 112 may receive this indication of the IoT device 122 to provision, for example, based at least in part on a customer's desire to provision the IoT device(s) 122. The processor(s) 600 may further receive identifying information about the IoT device to be provisioned, such as its IMEI and/or IMSI. This information may later be used to communicate with the IoT device 122 during the provisioning process, as described herein.

The instructions stored in the device manager 614, when executed by the processor(s) 600, may configure the device provisioning system 112 to determine if a particular IoT device 122 has a device profile template that may be used to generate a device profile for that IoT device 122. In some cases, the device provisioning system 112 may have a table with the identities and/or model types of IoT devices 122 that have the needed device profile template stored thereon.

The instructions stored in the parameter manager 616, when executed by the processor(s) 600, may configure the device provisioning system 112 to determine which configuration parameters are to be used to configure a device profile template on the IoT device 122. The device provisioning system 112 may be configured to send these configuration parameters to the IoT devices to be provisioned.

The instructions stored in the device profile manager 618, when executed by the processor(s) 600, may configure the device provisioning system 112 to determine the device profile that the IoT device needs to communicate on the mobile network. The device provisioning system 112 may partition and send the device profile in a sequence of messages, such as SMS messages, to the IoT device 122.

Figure 7:
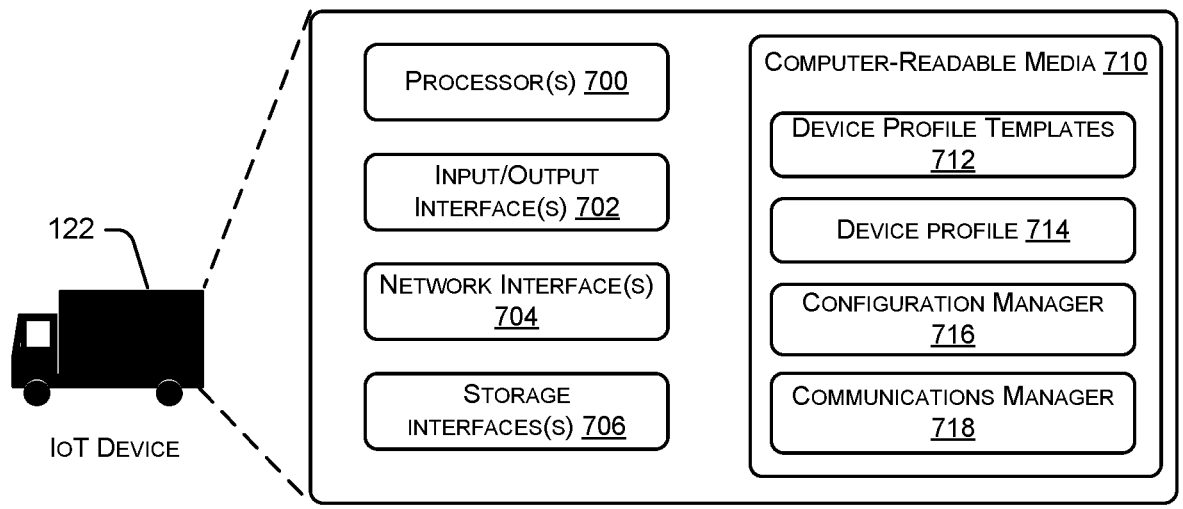
FIG. 7 illustrates a block diagram of an example IoT device that may be provisioned to a mobile network operator, in accordance with example embodiments of the disclosure.

FIG. 7 illustrates a block diagram of an example IoT device 122 that may be provisioned to a mobile network operator, in accordance with example embodiments of the disclosure.

In accordance with various embodiments disclosed herein, the terms IoT device 122, user equipment (UE), communication device, device, wireless communication device, wireless device, mobile device, terminal, wireless terminal, mobile terminal, and client device, may be used interchangeably herein to describe the IoT device 122. The IoT device 122 may be configured for transmitting/receiving data, wirelessly and/or over wired networks, using any suitable communications/data technology, protocol, or standard, such as third generation (3G), fourth generation (4G), fifth generation (5G), Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, Data Over Cable Service Interface Specification (DOCSIS), digital subscriber line (DSL), and/or any future IP-based network technology or evolution of an existing IP-based network technology.

The IoT device 122 may include one or more processor(s) 700, one or more input/output (I/O) interface(s) 702, one or more network interface(s) 704, one or more storage interface(s) 706, and computer-readable media 710. The descriptions of the one or more processor(s) 700, the one or more input/output (I/O) interface(s) 702, the one or more network interface(s) 704, the one or more storage interface(s) 706, and the computer-readable media 710 may be substantially similar to the descriptions of the one or more processor(s) 600, the one or more input/output (I/O) interface(s) 602, the one or more network interface(s) 604, the one or more storage interface(s) 606, and the computer-readable media 610, respectively, as described in FIG. 6 with respect to the device provisioning system 112, and in the interest of brevity, will not be repeated here.

Several modules such as instruction, data stores, and so forth may be stored within the computer-readable media 710 and configured to execute on the processor(s) 700. The computer readable media 710 may have stored thereon device profile templates 712, a device profile 714, a configuration manager 716, and a communications manager 718. It will be appreciated that each of the components 712, 714, 716, 718, may have instructions stored thereon that when executed by the processor(s) 700 may enable various functions pertaining to the operations of the IoT device 122.

The device profile templates 712 may be a portion of the computer-readable media 610 that may contain one or more of the device profile templates associated with a variety of MNOs. The processor(s) 700, may be configured to identify a device profile template needed to generate a device profile for the IoT device 122 and access that device profile template from the device profile templates 712. As discussed herein, the device profile templates 712 may be stored on the IoT device 122 prior to deployment of the IoT device 122. For example, the device profile templates 712 may be stored on the IoT device 122 during the manufacture of the IoT device 712.

The device profile 714 may be a portion of the computer-readable media 610 that may contain the device profile once the device profile is created and/or received in its entirety on the IoT device 714. The processor(s) 700 may be configured to access the device profile 714 for any suitable purpose, such as to communicate via the communications network to which it is provisioned. The device profile 714, in example embodiments, may be part of an eSIM, as part of the computer-readable media 610.

The instructions stored in the configuration manager 716, when executed by the processor(s) 700, may configure the IoT device 122 to receive a provisioning message and/or configuration messages from the device provisioning system 112. These messages may then be used by the processor(s) 700 to identify the proper device profile template to use to generate the device profile and to configure the device profile template, as described herein.

The instructions stored in the communications manager 718, when executed by the processor(s) 700, may configure the IoT device 122 to access the device profile 714 and access the mobile network to which it is configured to communicate over, as described herein.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
   one or more processors; and
   one or more computer-readable media storing a first device profile template associated with a first mobile network operator (MNO) and a second device profile template associated with a second MNO;
   the one or more computer-readable media further storing computer-executable instructions that, when executed by the one or more processors, cause the one or more processors to perform acts comprising:
   receiving, from a device provisioning system associated with the first MNO, provisioning data comprising a first configuration parameter;
   determining, based at least in part on the provisioning data, that the first device profile template is to be configured using the provisioning data;
   generating a device profile by configuring, based at least in part on the first configuration parameter, a profile element associated with the first device profile template; and
   storing the device profile to communicate via a communications network associated with the first MNO,
   wherein a size of the device profile is greater than a size of the provisioning data.

2. The system of claim 1, wherein receiving the provisioning data comprises receiving the provisioning data via short message service (SMS) messaging.

3. The system of claim 1, wherein the profile element is a service provider name (SPN).

4. The system of claim 1, wherein the device profile comprises greater than 3 kilobytes (KB) of data and the provisioning data comprises less than 12 bytes of data.

5. The system of claim 1, wherein the profile element is a first profile element, wherein the provisioning data comprises a second configuration parameter, and wherein generating the device profile further comprises configuring, based at least in part on the second configuration parameter, a second profile element.

6. The system of claim 1, the acts further comprising:
   receiving, from a second device provisioning system of the second MNO, second provisioning data comprising a second configuration parameter;
   determining, based at least in part on the second provisioning data, that the second device profile template is to be configured using the second provisioning data;
   generating a second device profile by configuring, based at least in part on the second configuration parameter, a second profile element; and
   storing the second device profile to communicate via a second communications network associated with the second MNO.

7. The system of claim 1, further comprising a first segment of the one or more computer-readable media and a second segment of the one or more computer-readable media, wherein the first device profile template and the second device profile template are stored in the first segment of the one or more computer-readable media, and wherein storing the device profile further comprises storing the device profile in the second segment of the one or more computer-readable media.

8. The system of claim 1, the acts further comprising:
   receiving, from a third MNO, second provisioning data, wherein a device profile template associated with the third MNO is unavailable on the one or more computer-readable media;
   receiving a plurality of messages carrying a second device profile associated with the third MNO;
   generating, based at least in part on the plurality of messages the second device profile; and
   storing the second device profile to communicate via a second communications network associated with the third MNO.

9. A computer-implemented method, comprising:
   identifying a device profile template associated with a mobile network;
   receiving, from a device provisioning system, a provisioning message;
   determining, based at least in part on the provisioning message, that the device provisioning system is associated with the device profile template;
   receiving, from the device provisioning system, one or more configuration parameters;
   configuring, based at least in part on the one or more configuration parameters, the device profile template to generate a device profile; and
   using the device profile to communicate via the mobile network,
   wherein a size of the device profile is greater than a size of the provisioning message, the configuration parameters, or both the provisioning message and the configuration parameters.

10. The computer-implemented method of claim 9, wherein the one or more configuration parameters indicate a service provider name (SPN).

11. The computer-implemented method of claim 9, wherein the one or more configuration parameters are carried by the provisioning message.

12. The computer-implemented method of claim 9, wherein the provisioning message includes at least one of an International Mobile Equipment Identity (IMEI) or International Mobile Subscriber Identity (IMSI) associated with an Internet of Things (loT) device.

13. The computer-implemented method of claim 9, wherein determining that the device provisioning system is associated with the device profile template further comprises:
   identifying, based at least in part on the provisioning message, an identity of a mobile network operator (MNO) associated with the mobile network; and
   determine that the device profile template is associated with the MNO.

14. The computer-implemented method of claim 9, further comprising:
   identifying a second device profile template associated with a second mobile network;
   receiving, from a second device provisioning system, a second provisioning message;
   determining, based at least in part on the second provisioning message, that the device provisioning system is associated with the second device profile template;

receiving, from the second device provisioning system, one or more second configuration parameters;

configuring, based at least in part on the one or more second configuration parameters, the second device profile template to generate a second device profile; and using the second device profile to communicate via the second mobile network.

15. A system comprising:

one or more processors; and one or more computer-readable media further storing computer-executable instructions that, when executed by the one or more processors, cause the one or more processors to perform acts comprising:

identifying that an Internet of Things (IoT) device is to be provisioned to communicate via a mobile network;

determining that the IoT device includes a device profile template; and sending, to the IoT device, one or more configuration parameters to configure the device profile template to generate a device profile, wherein a size of the device profile is greater than a size of the configuration parameters.

16. The system of claim 15, further comprising:

receiving, from the IoT device a message confirming that the IoT device is configured to communicate via the mobile network.

17. The system of claim 15, wherein the one or more configuration parameters are sent in a provisioning message which includes an identity of the mobile network.

18. The system of claim 17, wherein the provisioning message includes an identity of the IoT device.

19. The system of claim 15, wherein the one or more configuration parameters indicate at least one of a service provider name (SPN) or one or more roaming partner names.

20. The system of claim 15, further comprising:

identifying that a second IoT device is to be provisioned to communicate via the mobile network;

determining that the second IoT device does not include any device profile templates; and sending, to the second IoT device, a plurality of messages, each message carrying a segment of a second device profile to configure the second IoT device to communicate via the mobile network.

* * * * *